(12) United States Patent
Lee et al.

(10) Patent No.: US 7,478,200 B2
(45) Date of Patent: Jan. 13, 2009

(54) FRACTIONAL CACHING METHOD AND ADAPTIVE CONTENTS TRANSMITTING METHOD USING THE SAME

(75) Inventors: Yong Ju Lee, Daejeon (KR); Ok Gee Min, Daejeon (KR); Jung Keun Kim, Daejeon (KR); Jin Hwan Jeong, Seoul (KR); Choon Seo Park, Daejeon (KR); Hag Young Kim, Daejeon (KR); Myung Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 314 days.

(21) Appl. No.: 11/528,905

(22) Filed: Sep. 28, 2006

(65) Prior Publication Data

US 2007/0073975 A1  Mar. 29, 2007

(30) Foreign Application Priority Data

Sep. 28, 2005  (KR) ...................... 10-2005-0090749
Oct. 11, 2005   (KR) ...................... 10-2005-0095554

(51) Int. Cl.
*G06F 12/00* (2006.01)
(52) U.S. Cl. .................. 711/133; 711/130; 711/134; 711/135; 711/147
(58) Field of Classification Search ................. 711/133, 711/130, 134, 135, 147
See application file for complete search history.

(56) References Cited

U.S. PATENT DOCUMENTS 6,195,692 B1 * 2/2001 Hsu .......................... 725/110
7,092,370 B2 * 8/2006 Jiang et al. ................. 370/329
7,295,608 B2 * 11/2007 Reynolds et al. ....... 375/240.01

FOREIGN PATENT DOCUMENTS

| KR | 20030075155 | 9/2003 |
| KR | 102005 0055820 | 6/2005 |
| WO | WO 02/052730 | 7/2002 |

OTHER PUBLICATIONS

"Caching Strategies in Transcoding-Enabled Proxy Systems for Streaming Media Distribution Networks," Bo Shen et al, Apr. 2004, IEEE Transactions on Multimedia, pp. 375-386.

* cited by examiner

*Primary Examiner*—Stephen C Elmore
(74) *Attorney, Agent, or Firm*—Ladas & Parry LLP

(57) ABSTRACT

A fractional caching method and an adaptive contents transmitting method using the same are provided. The fractional caching method includes the steps of setting up a divided location for dividing a certain object into two parts, receiving an evict request for acquiring a space in the inside of the cache, when the evict request is transmitted, dividing a plurality of objects stored in the cache into a prefix-Object located in the head of the object and a suffix-Object located in the tail of the object from the divided location, and removing only the suffix-Object of each object, wherein the divided location is set up at a size rate that a size of the prefix-Object is in inverse proportion to the number of the destination types.

16 Claims, 5 Drawing Sheets

FRACTIONAL CACHING METHOD AND ADAPTIVE CONTENTS TRANSMITTING METHOD USING THE SAME

RELATED APPLICATION

The present application is based on, and claims priority from, Korean Patent Application Number 10-2005-0090749 filed Sep. 28, 2005 and Korean Patent Application Number 10-2005-0095554, filed Oct. 11, 2005, the disclosure of which is hereby incorporated by reference herein in its entirety.

BACKGROUND OF THE INVENTION

1. Field of the Invention

The present invention relates to a fractional caching method and an adaptive contents transmitting method using the same, and more particularly, to a fractional caching method, which is applied to a transcoding streaming server to transmit adaptive contents, and an adaptive contents transmitting method using the same.

2. Description of the Related Art

Applications of Internet, which is a computer communication network for connecting all nations in the world, are increasing as network performance and computing performance are improved. Accordingly, request for receiving a real-time service of media contents seamlessly at high speed is increasing.

As a digital expressing method of the media contents is diversified and sophisticated, an adaptive contents transmitting technology for transforming and providing media contents of a certain type into media contents of other type is increasingly required.

That is, the most important thing is to transmit the media contents seamlessly at high speed and provide media contents of a type which is proper to an environment of a user terminal such as a network bandwidth, a file format, and a compression technology.

A conventional adaptive contents transmitting method adopted an offline method of selecting and providing proper media content according to a user terminal type and a network bandwidth type in a state that diverse types of destination are formed and stored through a transcoder in advance with respect to one source type. However, since the types of the user terminals determining the destination type have been changed very fast, an on-the-fly method is also adopted to support diverse types of user terminals. In the on-the-fly method, the media contents are provided to the user terminal by performing transcoding in real time when the user requests streaming.

A server for performing transcoding and streaming in conformity with the types of the user terminal and the network bandwidth in real time upon request of the user is called a transcoding proxy streaming server. Since a proxy extension model having a transcoding function of the on-the-fly method requires a quantity of Central Processing Unit (CPU) loads due to characteristics of the transcoding, the proxy extension model is realized as a proxy cluster method for connecting a plurality of servers.

In the streaming server and the proxy cluster including the transcoding function, it is necessary to instantly change a destination type through caching of an original media content of a source type to provide a fast service. Therefore, a new caching policy for supporting diverse destination types by efficiently using a limited caching space and providing a seamless service at high speed is required.

SUMMARY OF THE INVENTION

Accordingly, the present invention is directed to a fractional caching method and an adaptive content transmitting method using the same that substantially obviates one or more problems due to limitations and disadvantages of the related art.

An object of the present invention is to provide a fractional caching method which can maximally acquire a caching space through object division in transmission of the adaptive contents and perform caching of diverse destination types, and an adaptive contents transmitting method using the same.

Another object of the present invention is to provide a fractional caching method which can perform simultaneous transcoding into diverse destination types by maximally acquiring the caching space through the object division and complementing a limitation in the number of the simultaneous transcoding on the basis of node unit caused by a Central Processing Unit (CPU) load, which is a characteristic of a transcoding work, through connection between brother nodes, and an adaptive contents transmitting method using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a fractional caching method and an adaptive contents transmitting method using the same.

According to an aspect of the present invention, there is provided a fractional caching method in a transcoding proxy streaming server for transcoding an object of a certain type into an object of a plurality of destination types based on a cache, the method including the steps of: a) setting up a divided location for dividing a certain. object into two parts; b) receiving an evict request for acquiring a space in the inside of the cache; c) when the evict request is transmitted, dividing a plurality of objects stored in the cache into a prefix-Object located in the head of the object and a suffix-Object located in the tail of the object from the divided location; and d) removing only the suffix-Object of each object, wherein the divided location is set up at a size rate that a size of the prefix-Object is in inverse proportion to the number of the destination types.

According to another aspect of the present invention, there is provided an adaptive contents transmitting method for caching a source type stored in a contents managing server and transcoding the source type into a destination type corresponding to a plurality of heterogeneous user terminals, the method including the steps of: a) when an object of a specific destination type is requested, searching an object stored in the cache and determining whether the object is fetched and transcoded; b) when fetching and/or transcoding is required, checking whether a caching space is enough; c) when the caching space is not enough, dividing the objects stored in the cache into two parts of a prefix-Object and a suffix-Object, remaining only the prefix-Object and removing the suffix-Object; and d) when the caching space is enough, performing fetching, transcoding or streaming on the object according to the determination of the step a).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
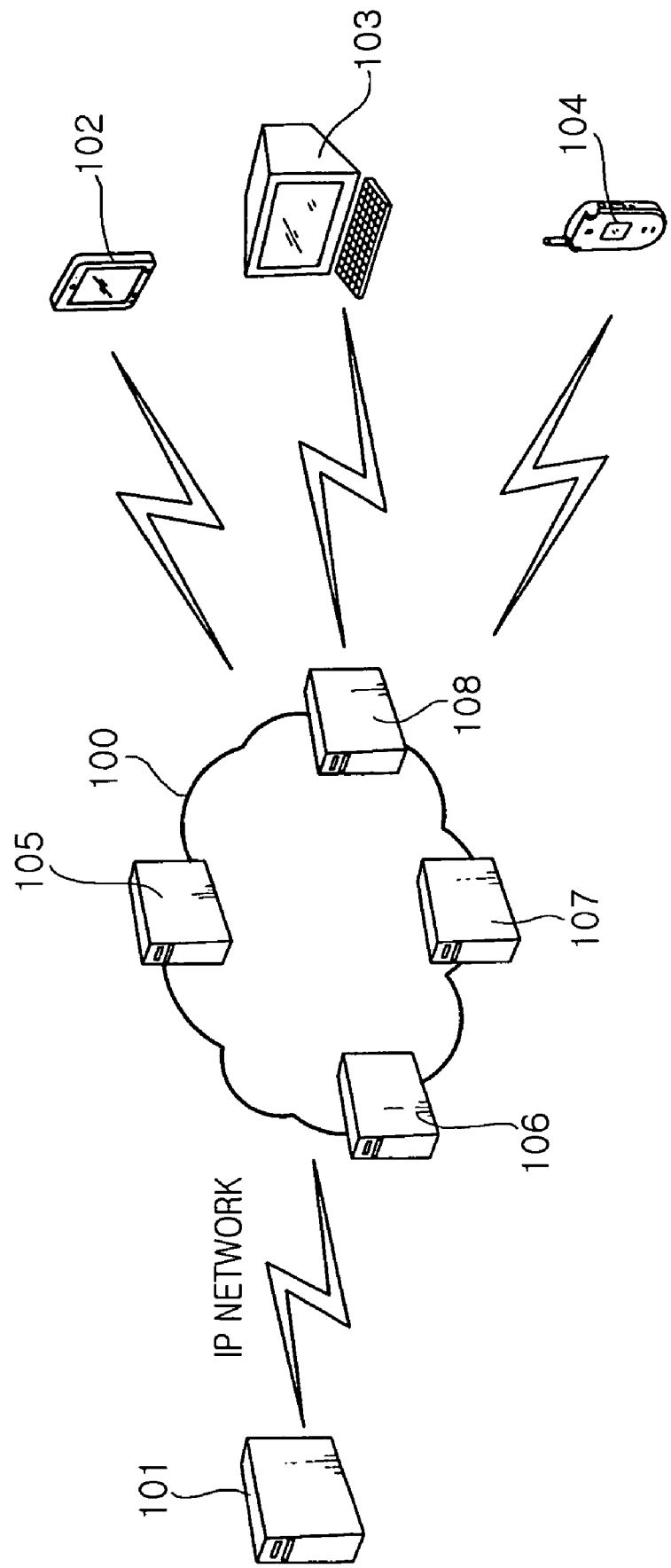
FIG. 1 shows a media contents streaming service network, to which the present invention is applied.

FIG. 1 shows a media contents streaming service network, to which the present invention is applied, and it shows a contents managing server 101, heterogeneous user terminals 102 to 104 having diverse network bandwidths, a proxy cluster 100, a contents streaming server 105 and transcoding proxy streaming servers 106 to 108.

The contents managing server 101 stores objects of a representative contents type. The heterogeneous user terminals include a PDA 102, a desktop computer 103, and a cellular phone 104. The contents streaming server 105 performs streaming on the object stored in the contents managing server 101 to the user terminals 102 to 104 without transcoding. The transcoding proxy streaming servers 106 to 108 included in the proxy cluster 100 performs caching on the object stored in the contents managing server 101, transcodes the object into a requested destination type and provides the object to the user terminals 102 to 104.

The contents managing server 101 is connected to the transcoding proxy streaming cluster 100 through an IP network.

One of the contents streaming server 105 or a plurality of transcoding proxy streaming servers 106 to 108 seamlessly transmits streaming data upon request for a specific object from the diverse heterogeneous user terminals 102 to 104.

Figure 2A:
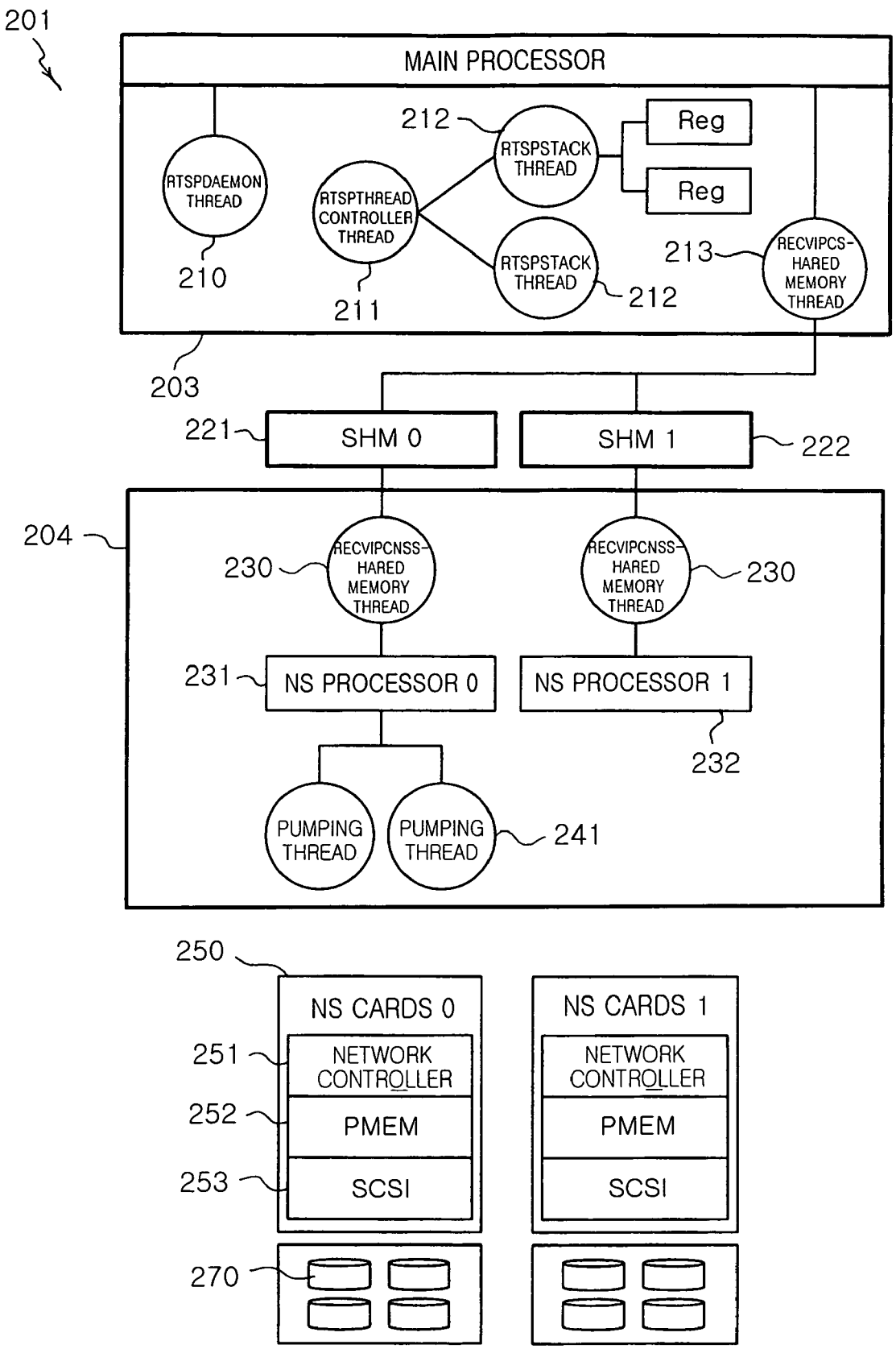
FIGS. 2A and 2B are block diagrams illustrating a streaming server and a transcoding proxy streaming server, to which the present invention is applied.
Figure 2B:
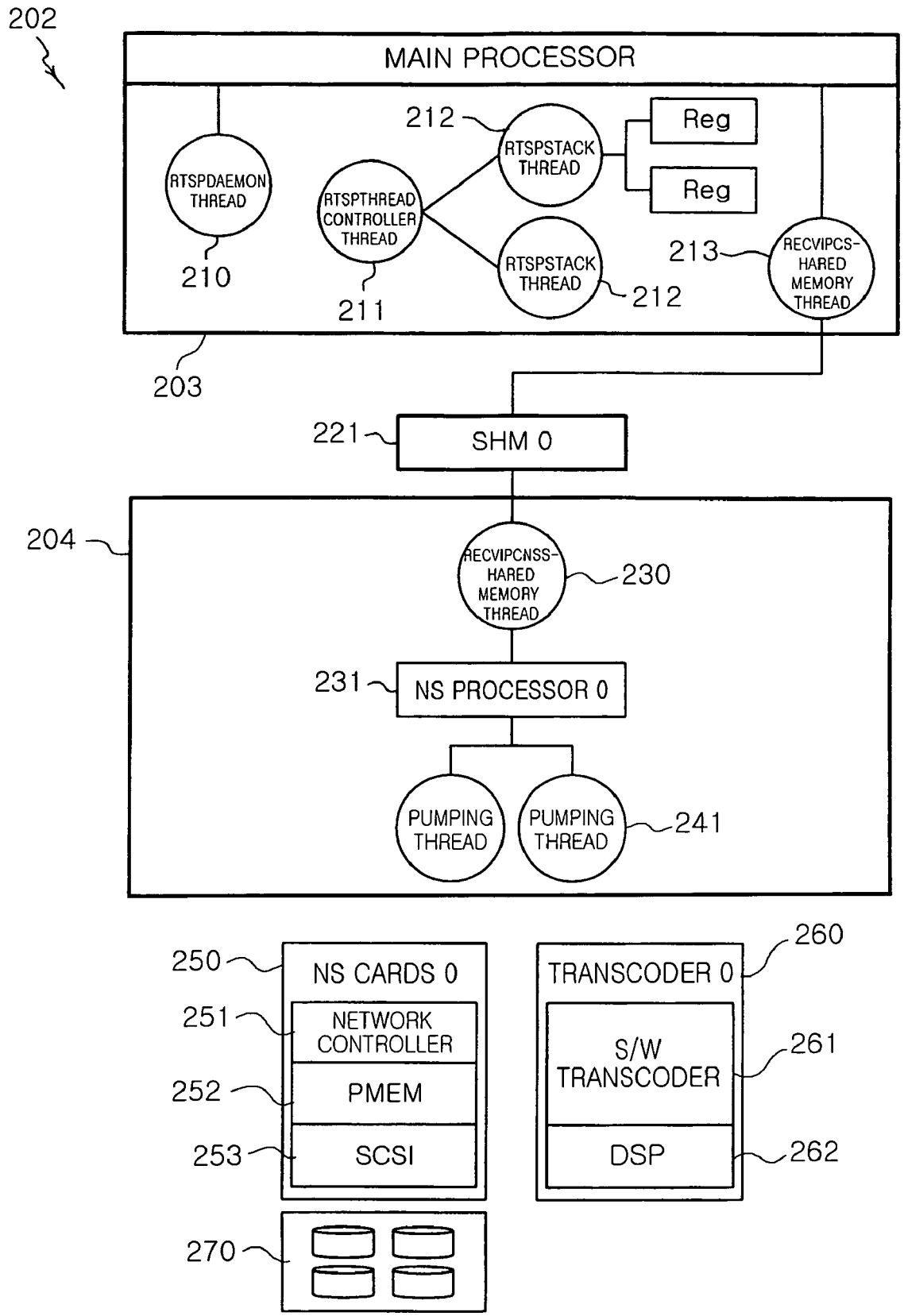

FIGS. 2A and 2B are block diagrams illustrating a contents streaming server and a transcoding proxy streaming server included in a media contents streaming service network.

A contents streaming server 201 and a transcoding proxy streaming server 202 include a main processing unit 203, which is a control process, and an NS processing unit 204 including at least one of NS processors 231 and 232, which are a data transmitting process.

In the contents streaming server 201 and the transcoding proxy streaming server 202, the main processing unit 203 is connected to a user through an RtspDaemonThread 210 receiving a real time streaming protocol (RTSP), which is a streaming proprietary protocol. The main processing unit 203 controls the connection with the user by an RtspThreadControllerThread 211, and manages the connection with the user by a new RtspStackThread 212, in threshold higher than a certain level. Also, the main processing unit 203 transmits/receives data to/from the NS processing unit 204 by using shared memories 221 and 222 through a recvIPCSharedMemoryThread 213.

In the contents streaming server 201 and the transcoding proxy streaming server 202, the NS processors 231 and 232 of the NS processing unit 204 manages a recvIPCNSSharedMemoryThread 230 for transmitting/receiving data through the shared memories 221 and 222, and a pumping thread 241 for providing a service in a disk hardware environment of a lower level.

The contents streaming server 201 having a plurality of NS cards 250 executes a streaming accelerating function and stores streaming data through a plurality of disk arrays 270. The NS card 250 includes a network controller 251, a peripheral component interconnect (PCI) memory (PMEM) 252 and a small computer system interface (SCSI) controller 253.

The transcoding proxy streaming server 202 further includes a transcoder 260 in addition to the NS card 250, which is the above-mentioned streaming accelerating hardware, and performs real-time transcoding. The transcoder 260 includes a transcoder 261 realized as software and a hardware device (DSP) 262.

When there are contents data of a version corresponding to a network bandwidth of the user terminals 102 to 104, the NS processor 204 performs the pumping thread 241 for reading corresponding data in the disk arrays 270 through the NS card 250 upon streaming service request from specific user terminals 102 to 104 and transmitting the data to the user terminals 102 to 104.

When a service requiring transcoding is requested, the NS processor 204 of the transcoding proxy streaming server 202 reads contents with a bit rate of an upper version through the NS card 250, transcodes the contents into an object of the bit rate of the destination type through the transcoder 260 and transmits the object to the user.

The fractional caching method and transcoding method of the present invention will be described with reference to FIGS. 1 and 2.

The contents managing server 101 includes a set S of objects of a representative content type and an object Obi of diverse versions corresponding to a network bandwidth bi of diverse user terminals in each object O included in the set S. The object can include an audio, a video, an image and a text. It is preferred that the contents managing server 101 has Obi of diverse versions with respect to the object O. However, since it is possible to transcode Obi into Obi of other version in the transcoding proxy streaming servers 106 to 108, it is not necessary to have Obi of all versions.

An object Obj of a version, which can be transcoded into an object Obi of a specific version, should be an object of a higher version than the requested object Obi. It means that bj>bi. Herein, bj is a network bandwidth of the object Obj and bi is a network bandwidth of the object Obi.

The transcoding proxy streaming servers 106 to 108 perform caching on an object of a representative type stored in the contents managing server 101, which is called a source type hereinafter, transcode the object into a type of user terminals 102 to 104 requesting the object, which is called a destination type hereinafter, and performs streaming on the object to the user terminals 102 to 104. When a caching space is managed, the objects Obi and Obj stored in the caching space are divided into a first part, i.e., a prefix-Obi and a second part, i.e., a suffix-Obi. The prefix-Obi is located in the head of the object from the divided location and the suffix-Obi is located in the tail of the object from the divided location. As described above, one object is divided into the prefix-Obi and the suffix-Obi. Only the prefix-Obi remains in the cache and the suffix-Obi is removed. When complexity of the user terminal increases, a size of the prefix-Obi is reduced by setting up the divided location of the prefix-Obi and the suffix-Obi close to the head of the object and it makes it possible to simultaneously perform caching on diverse destination types in a limited caching space. When the complexity of the user terminal decreases, a size of the prefix-Obi is increased by setting up the divided location close to the tail of the object. Accordingly, the caching can be performed on the object close to the destination type.

The objects of diverse types can be simultaneously transcoded in the limited caching space by remaining a part of the fetched or transcoded object, which is temporally stored in the inside of the caching space.

In one transcoding proxy streaming server 106 based on the fractional caching method, 6 events which may be generated by transmitting contents upon request of the user are defined as follows:

1. Full Fetch (FF): An object of a requested version or a version to be transcoded does not exist in the transcoding proxy streaming server 106, but exists in the contents managing server 101. Therefore, transcoding is not required. An object of a version corresponding to the destination type in the contents managing server 101 is fetched to the cache and streaming is instantly performed.

2. Full Hit (FH): The object of the version corresponding to the destination type exists in a complete form in the transcoding proxy streaming server 106. Streaming is performed without fetch from the contents managing server 101 or transcoding.

3. Full Transcoding (FT): An object Obi of a version corresponding to the destination type does not exist in the transcoding proxy streaming server 106, but an object Obj of a version to be transcoded into the destination type exists. Transcoding and streaming are performed.

4. Full Fetch Transcoding (FFT): The object Obi of the version corresponding to the destination type and the object Obj of the version to be transcoded into the destination type do not exist in the transcoding proxy streaming server 106. Also, the destination type does not agree with a source type. The object of the version to be transcoded is fetched from the contents managing server 101, and transcoding and streaming are performed.

5. Partial Hit and Fetch (PHF): Only the prefix-Obi among the object Obi of the version corresponding to the destination type exists in the transcoding proxy streaming server 106. Streaming is instantly performed on the prefix-Obi and is performed on the suffix-Obi after fetch from the contents managing server 101 and/or transcoding.

6. Partial Transcoding and Fetch Transcoding (PTFT): Only the prefix-Obj of the object Obj of the version to be transcoded into the Obi of the object of the version corresponding to the destination type exists. Transcoding and streaming are performed on the prefix-Obj of the object Obj. Streaming is performed on the suffix-Obj after fetch from the contents managing server 101 and/or transcoding.

In case of the adaptive contents transmitting method operated by the proxy cluster 100 connecting a plurality of transcoding proxy streaming servers 106 to 108 to reduce the CPU load, events defined below are further generated.

1. Sibling Full Hit (SFH): The object Obi of the version corresponding to the destination type exists in other transcoding proxy streaming servers 107 and 108 of the proxy cluster 100. A user request is transmitted to perform streaming in the transcoding proxy streaming servers 107 and 108.

2. Sibling Partial Hit (SPH): The prefix-Obi of the object Obi of the version corresponding to the destination type in other transcoding proxy streaming servers 107 and 108 of the proxy cluster 100 exists. A user request is transmitted to perform fractional fetch, transcoding and streaming in the transcoding proxy streaming servers 107 and 108.

3. Sibling Full Transcoding Hit (SFTH): The object Obj which can be transcoded into the object of the version corresponding to the destination type exists in other transcoding proxy streaming servers 107 and 108 of the proxy cluster 100. A user request is transmitted to perform transcoding and streaming in the transcoding proxy streaming servers 107 and 108.

4. Sibling Partial Transcoding Hit (SPTH): The prefix-Obj among the object Obj which can be transcoded into the object of the version corresponding to the destination type exists in other transcoding proxy streaming servers 107 and 108 of the proxy cluster 100 exists. A user request is transmitted to perform fetch, transcoding and streaming in the transcoding proxy streaming servers 107 and 108.

Figure 3:
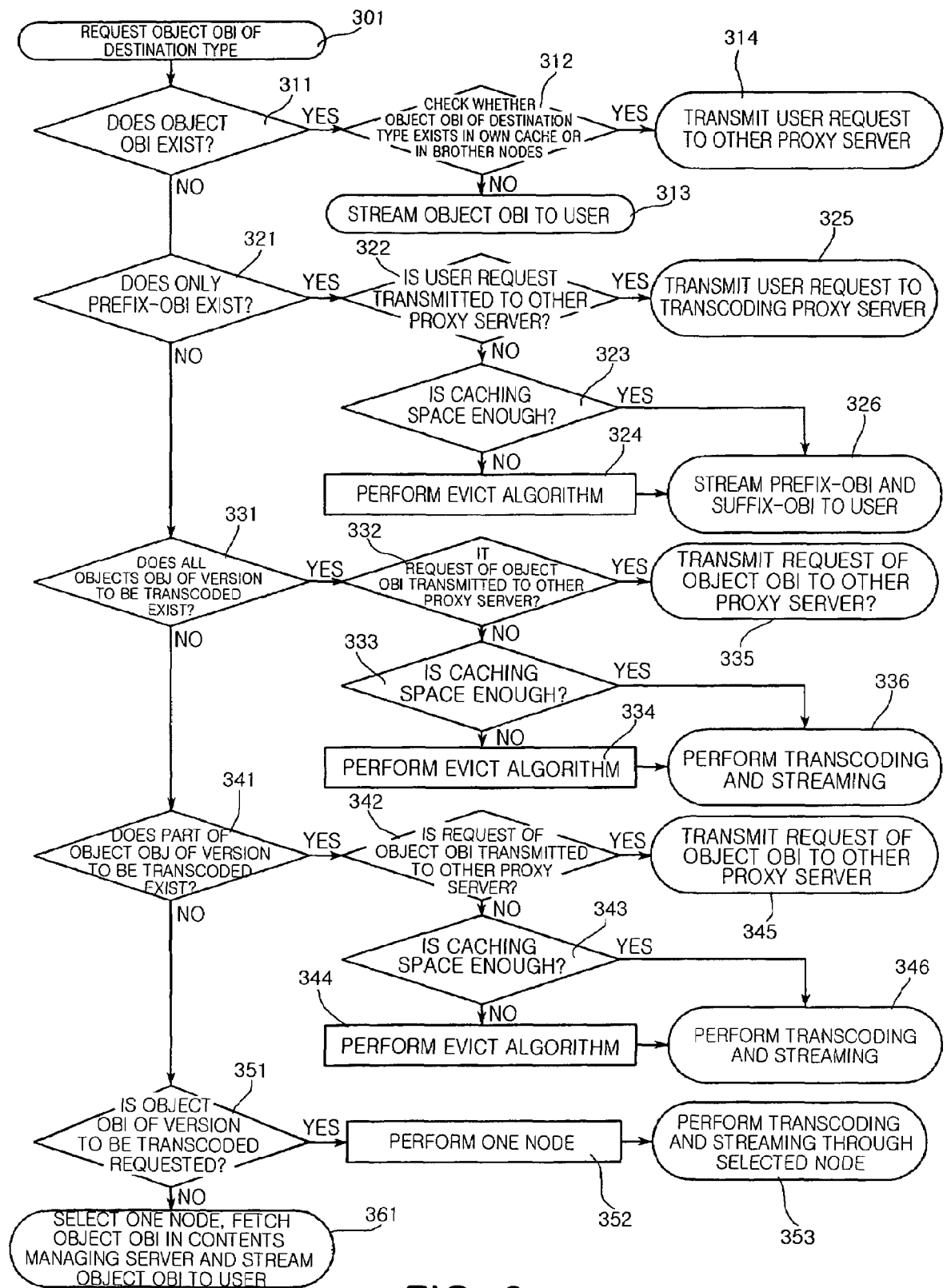
FIG. 3 is a flowchart describing the adaptive contents transmitting method of the present invention.

FIG. 3 is a flowchart describing the adaptive contents transmitting method of the present invention and it sequentially shows a performing procedure of the events defined above. Only one transcoding proxy streaming server 106 in the proxy cluster 100 will be described as an example, but it can be also applied to other transcoding proxy streaming servers 107 and 108.

At step S301, the transcoding proxy streaming server 106 receives a streaming request for the object Obi of the version corresponding to the destination type of the user. It is checked at step S311 whether the object Obi of the destination type exists in the proxy cluster 100.

When it turns out that the object Obi of the destination type completely exists in the proxy cluster 100, it is checked at step S312 whether the object Obi of the destination type exists in own cache or in a brother node of the proxy cluster 100, i.e., the transcoding proxy streaming servers 107 and 108. When the object Obi of the destination type exists in the brother node of the proxy cluster 100, a user request is transmitted to the transcoding proxy streaming server 107 or 108 at step S314, and logic flow goes to the step S301 again in the transcoding proxy streaming servers 107 and 108. Reversely, when the object Obi of the destination type exists in own cache, the object Obi of the checked destination type is streamed to the user terminals 102 to 104 at step S313.

When it turns out that the object Obi of the destination type does not completely exist in the proxy cluster 100 and only the prefix-Obi exists at step S321, the user request is transmitted to the transcoding proxy streaming server 107 or 108 at steps S322 and 325 under a condition that the prefix-Obi of the object Obi of the destination type exists in other transcoding proxy streaming server 107 or 108, which is the brother node of the proxy cluster 100. Under a condition that the prefix-Obi of the object Obi of the destination type exists in own cache, it is checked at step S323 whether the caching space for fetch of the suffix-Obi of the object Obi is enough. When the caching space is enough, the suffix-Obi of the requested object Obi is fetched from the contents managing server 101, and the searched prefix-Obi and the fetched suffix-Obi are combined. The combined prefix-Obi and suffix-Obi are streamed to the user at step S326. When the caching space is not enough, an evict algorithm for removing old data in the cache is performed at step S324. When the enough caching space is acquired, the suffix-Obi of the requested object Obi is fetched from the contents managing server 101, and the searched prefix-Obi and the fetched suffix-Obi are combined. Streaming is performed on the combined prefix-Obi and suffix-Obi are streamed to the user at step S326. The evict algorithm of the step S324 is to divide each object into the prefix-Obi and the suffix-Obi and remove only the suffix-Obi. The evict algorithm will be described in detail in description of FIG. 4.

When the prefix-Obi of the object Obi of the version requested at the step S321 does not exist, it is checked at step S331 whether the object Obj of the version to be transcoded into the destination type exists in the proxy cluster 100. Herein, bj>bi. When the object Obj to be transcoded completely exists and the object Obj exists in the brother node of the proxy cluster 100, i.e., other transcoding proxy streaming servers 107 and 108, a request of the object Obi is transmitted to the transcoding proxy streaming servers 107 and 108. A streaming service is provided to the user in the transcoding proxy streaming servers 107 and 108 at steps S332 and 335. When the object Obj exists in own cache, it is checked at step S333 whether the caching space is enough to transcode the object Obj. When the caching space is not enough, the caching space is acquired by removing the suffix-Obi of other objects in the cache through the evict algorithm at step S334. When an enough caching space is acquired, the searched object Obj is transcoded into the object Obi of the destination type and the transcoded object Obi is streamed to user terminal at step S336.

When the object Obj to be transcoded does not completely exist at the step S331, it is checked at step S341 whether the prefix-Obi of the object Obj of the version to be transcoded exists.

When the object Obj of the version to be transcoded exists in other transcoding proxy streaming servers 107 and 108 of the proxy cluster 100, a request of the object Obi is transmitted to the transcoding proxy streaming servers 107 and 108. A streaming service is provided from the transcoding proxy streaming servers 107 and 108 to the user at steps S342 and 345.

When the prefix-Obi of the requested object Obj of the version to be transcoded exists in own cache, it is checked at step S343 whether the caching space is enough. When the caching space is not enough, the caching space is acquired at step S344 by removing the suffix-Obi of other objects in the cache through the evict algorithm. Subsequently, when the caching space is enough, the streaming service is provided by transcoding the prefix-Obj of the Obj into Obi. The suffix-Obj of the Obj is sequentially fetched from the contents managing server 101, transcoded and transmitted to the user at step S346.

When the object Obi of the same version as the destination type and the object Obj of the version to be transcoded do not exist on the cluster 100, and the object Obi of the version requested by the user does not exist in the contents managing server 101 at step S351, a node having an enough caching space, i.e., certain transcoding proxy streaming servers 106 to 108, are selected. The same object of the version to be transcoded in the contents managing server 101 is transmitted at step S352 and transcoded. The object is streamed to the user terminals 102 to 104 at step S353.

When the object Obi of the same version and the object Obj of the version to be transcoded do not exist on the cluster 100, but the object Obi of the requested version exists in the contents managing server 101, the object Obi is fetched from the contents managing server 101 and streamed to the user terminals 102 to 104 at step S361.

Figure 4:
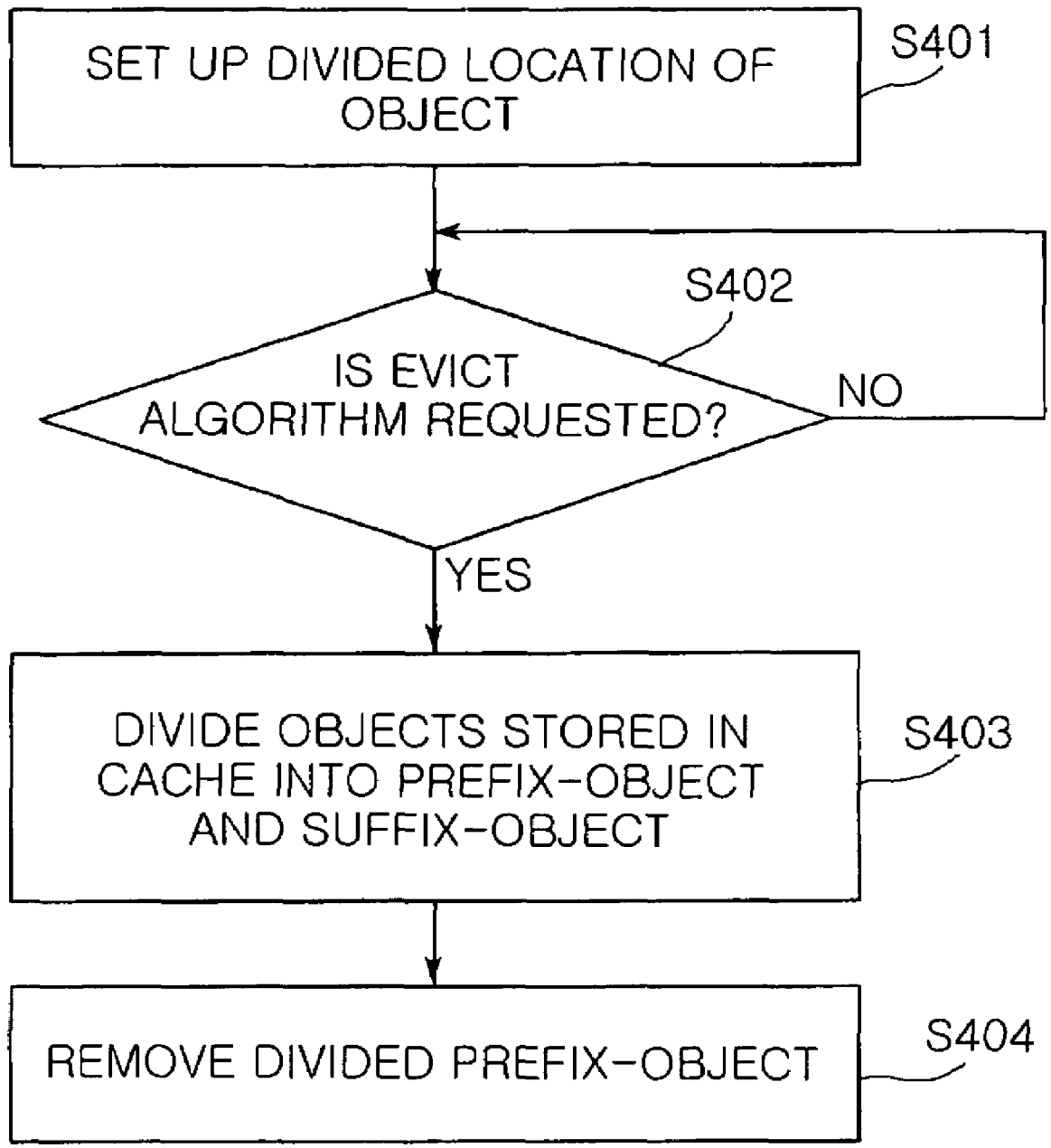
FIG. 4 is a flowchart describing the fractional caching method of the present invention.

FIG. 4 is a flowchart describing a fractional caching method of the evict algorithm operated at the steps S324, S334 and S344.

The transcoding proxy streaming servers 106 to 108 set up reference location for dividing a certain object into the prefix-Object and the suffix-Object at step S401. It is preferred to set up the divided location at a size rate that a rate of the prefix-Object is in inverse proportion to the number of the destination types. That is, when the destination types are diversified, the divided location is set up in the head of the object to reduce the size rate of the prefix-Object. When the destination types are not complicated, the divided location is set up in the tail of the object to increase the size rate of the prefix-Object.

When the evict algorithm of the steps S324, S334 and S344 is requested due to the lack of the caching space at step S402 while transcoding is performed as shown in FIG. 3, objects in the inside of the cache are divided into the prefix-Object and the suffix-Object according to the divided location at step S403.

The divided suffix-Object is removed from the cache and only the prefix-Object of all objects remains in the cache at step S404.

The procedure of the step S404 can be limitedly operated only until the enough caching space is acquired after checking a size of a required space. However, when the enough caching space is not acquired after removing the suffix-Object of all objects, it is possible to remove the prefix-Object.

The object in the cache is removed according to a least recently used method for preferentially removing a least used object within a predetermined cycle.

As described above, the present invention can acquire objects of diverse destination types by storing only parts of the object instead of storing entire object in a limited caching space in the transcoding proxy streaming server or the transcoding proxy streaming cluster. Accordingly, the present invention can provide a fast streaming service seamlessly to the many users.

The above described method according to the present invention can be embodied as a program and stored on a computer readable recording medium. The computer readable recording medium is any data storage device that can store data which can be thereafter read by the computer system. The computer readable recording medium includes a read-only memory ROM, a random-access memory RAM, a CD-ROM, a floppy disk, a hard disk, an optical magnetic disk, and carrier waves such as data transmission through the Internet. The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A fractional caching method in a transcoding proxy streaming server for transcoding an object of a certain type into an object of a plurality of destination types based on a cache, the method comprising the steps of:

a) setting up a divided location for dividing a certain object into two parts;

b) receiving an evict request for acquiring a space in the inside of the cache;

c) when the evict request is transmitted, dividing a plurality of objects stored in the cache into a prefix-Object located in the head of the object and a suffix-Object located in the tail of the object from the divided location; and d) removing only the suffix-Object of each object, wherein the divided location is set up at a size rate that a size of the prefix-Object is in inverse proportion to the number of the destination types.

2. The method of claim 1, further comprising the steps of:

e) checking a size of a space to be acquired; and f) comparing the size of the space to be acquired with the size of the space acquired in the inside of the cache, and repeating the process of the steps c) and d) until the size of the acquired space becomes equal to or larger than the size of the space to be acquired.

3. The method of claim 2, further comprising the step of:

g) when the size of the acquired space is smaller than the size of the space to be acquired although the suffix-Object stored in the cache is completely removed, removing the rest prefix-Object of each object.

4. The method of claim 2, wherein the step d) is operated according to a least recently used method for preferentially removing a least used object within a predetermined cycle.

5. The method of claim 3, wherein the step g) is operated according to a least recently used method for preferentially removing a least used object within a predetermined cycle.

6. An adaptive contents transmitting method for caching a source type stored in a contents managing server and transcoding the source type into a destination type corresponding to a plurality of heterogeneous user terminals, the method comprising the steps of:

a) when an object of a specific destination type is requested, searching an object stored in the cache and determining whether the object is fetched and transcoded;

b) when fetching and/or transcoding is required, checking whether a caching space is enough;

c) when the caching space is not enough, dividing the objects stored in the cache into two parts of a prefix-Object and a suffix-Object, remaining only the prefix-Object and removing the suffix-Object; and d) when the caching space is enough, performing fetching, transcoding or streaming on the object according to the determination of the step a).

7. The method of claim 6, wherein the step a) includes the steps of:

a1) checking whether all objects of the requested destination type exist among pre-cached objects;

a2) checking whether only the prefix-Object of the object of the requested destination type exists among pre-cached objects;

a3) checking whether all objects of a version to be transcoded into the requested destination type exist among pre-cached objects; and a4) checking whether the prefix-Object of the object of the version to be transcoded into the requested destination type exists among the pre-cached objects.

8. The method of claim 7, wherein in the step d), when all objects of the requested destination type exist, the object is streamed to a user.

9. The method of claim 7, wherein in the step d), when only the prefix-Object among objects of the requested destination type exists, the prefix-Object is streamed and the suffix-Object of the object is fetched from the contents managing server and streamed to the user.

10. The method of claim 7, wherein in the step d), when all objects of the type to be transcoded into the requested destination type exist, the object which is searched without fetch and has a type to be transcoded is transcoded into the destination type and streamed.

11. The method of claim 7, wherein in the step d), when the prefix-Object of the object of the type to be transcoded into the destination type exists, the prefix-Object is transcoded and streamed, and the suffix-Object is fetched from the contents managing server, transcoded and streamed.

12. The method of claim 7, wherein the step a) further includes the steps of:

a5) checking whether the entire object of the destination type or the prefix-Object, and the entire object of the version to be transcoded into the destination type or the prefix-Object exist in a brother node of a proxy cluster; and a6) when the entire object of the destination type or the prefix-Object, and the entire object of the version to be transcoded into the destination type or the prefix-Object do not exist in own cache, but exist in the brother node of the proxy cluster, transmitting a user request to the corresponding brother node.

13. The method of claim 7, wherein the object of the version to be transcoded has a higher bit rate than the object of the destination type.

14. The method of claim 6, wherein when complexity of the destination type increases, the divided location of the prefix-Object and the suffix-Object is located close to the head of the object, and when complexity of the destination type decreases, the divided location is located close to the tail of the object.

15. The method of claim 6, wherein when a size of the acquired space is not enough although the suffix-Object stored in the cache is completely removed, the prefix-Object is removed.

16. The method of claim 15, wherein the prefix-Object or the suffix-Object is removed according to a least recently used method for preferentially removing a least used object within a predetermined cycle.

* * * * *